(12) United States Patent
Sakurai et al.

(10) Patent No.: US 7,088,084 B2
(45) Date of Patent: Aug. 8, 2006

(54) POWER SUPPLY CIRCUIT CAPABLE OF RAPIDLY CHANGING OUTPUT VOLTAGES

(75) Inventors: Takayasu Sakurai, Setagaya-ku (JP); Hiroshi Kawaguchi, Koto-ku (JP); Kohei Onizuka, Nerima-ku (JP)

(73) Assignee: Semiconductor Technology Academic Research Center, Yokohama (JP)

( * ) Notice: Subject to any disclaimer, the term of this patent is extended or adjusted under 35 U.S.C. 154(b) by 0 days.

(21) Appl. No.: 11/205,491

(22) Filed: Aug. 16, 2005

(65) Prior Publication Data

US 2006/0038544 A1 Feb. 23, 2006

(30) Foreign Application Priority Data

Aug. 20, 2004 (JP) ............................. 2004-241356

(51) Int. Cl.
*G05F 1/40* (2006.01)
(52) U.S. Cl. .................................................... 323/282
(58) Field of Classification Search ................ 323/282, 323/283, 284; 327/535, 537, 538; 307/38, 307/39, 41
See application file for complete search history.

(56) References Cited

U.S. PATENT DOCUMENTS

| | | | |
|---|---|---|---|
| 5,513,089 A * | 4/1996 | Sudo et al. | 363/21.11 |
| 6,075,295 A * | 6/2000 | Li | 307/39 |
| 6,281,665 B1 * | 8/2001 | Miyaba et al. | 323/224 |
| 6,914,474 B1 * | 7/2005 | Yamahira | 327/535 |

FOREIGN PATENT DOCUMENTS

JP 2002-369505 A 12/2002

* cited by examiner

*Primary Examiner*—Adolf Berhane
(74) *Attorney, Agent, or Firm*—Christensen O'Connor Johnson Kindness PLLC (57) ABSTRACT

A voltage control circuit is connected to a voltage source. The voltage control circuit changes voltages of n different values and outputs them to an output node of the voltage control circuit according to control signals. A first switch element is connected between the output node of the voltage control circuit and a reference voltage node, and a second switch element is connected between the output node of the voltage control circuit and an output node of the voltage source. The first switch element is controlled so as to be conductive when the voltage control circuit changes the voltage of the output node from a first voltage to a second voltage that is lower than the first voltage, and the second switch element is controlled so as to be conductive when the voltage control circuit changes the voltage of the output node from a second voltage to a first voltage.

10 Claims, 5 Drawing Sheets

POWER SUPPLY CIRCUIT CAPABLE OF RAPIDLY CHANGING OUTPUT VOLTAGES

CROSS-REFERENCE TO RELATED APPLICATIONS

This application is based upon and claims the benefit of priority from prior Japanese Patent Application No. 2004-241356, filed Aug. 20, 2004, the entire contents of which are incorporated herein by reference.

BACKGROUND OF THE INVENTION

1. Field of the Invention

The present invention relates to a power supply circuit that changes output voltages according to control signals.

2. Description of the Related Art

As conventional power supply circuits, various kinds of power supply circuits including a dropper type converter, a buck converter, and a switched capacitor converter have been known.

On the other hand, plural power supply voltages are required for low electricity consumption of an objective circuit, and it is not preferable to arrange low voltage wires in an integrated circuit from viewpoint of electricity consumption. Therefore, there is a demand for a power supply circuit that can change output voltages among plural values at a high speed.

When using the various kinds of power supply circuits described above for this purpose, it is necessary, in an changing output voltage from a high voltage to a low voltage, to discharge energy accumulated in load carrying capacity in the case of the dropper type converter system, and energy accumulated in load carrying capacity and energy accumulated in an inductor and a capacitor in a power supply circuit in the case of the buck converter system and the switched capacitor system.

On the other hand, in changing an output voltage from a low voltage to a high voltage, it is necessary to supply corresponding energy to load carrying capacity in the case of the dropper type converter system, and load carrying capacity and an inductor and a capacitor in a power supply circuit in the case of the buck converter system and the switched capacitor system. Therefore, enormous transition time is required in changing the output voltage from a high voltage to a low voltage, or vice versa, and any of the kinds of conventional power supply circuits is not suited for such a purpose.

One example of a power supply circuit of the buck converter system is disclosed, for example, in Jpn. Pat. Appln. KOKAI Publication No. 2002-369505.

BRIEF SUMMARY OF THE INVENTION

Accordingly, an object of the present invention is to provide a power supply circuit that can change output voltages from a high voltage to a low voltage, or vice versa, at a high speed.

According to an aspect of the present invention, there is provided a power supply circuit comprising: a voltage source whose one end is connected to a reference voltage node, the voltage source having a first output node; a voltage control circuit which receives a voltage of the first output node, the voltage control circuit having a second output node, and changing voltages of n (n being a positive integer of 2 or more) different values according to control signals to output them to the second output node; a first switch element connected between the second output node and the reference voltage node; a second switch element connected between the first output node and the second output node; and a switch control circuit which controls the first switch element so as to be conductive when the voltage control circuit changes the voltage of the second output node from a first voltage to a second voltage that is lower than the first voltage, and which controls the second switch element so as to be conductive when the voltage control circuit changes the voltage of the second output node from the second voltage to the first voltage.

DETAILED DESCRIPTION OF THE INVENTION

The present invention will be illustrated in more details by means of embodiments with reference to the accompanying drawings hereinafter. In all the drawings for explaining the embodiments, same reference numerals denote the same components, and repeated explanations thereof are omitted.

Figure 1:
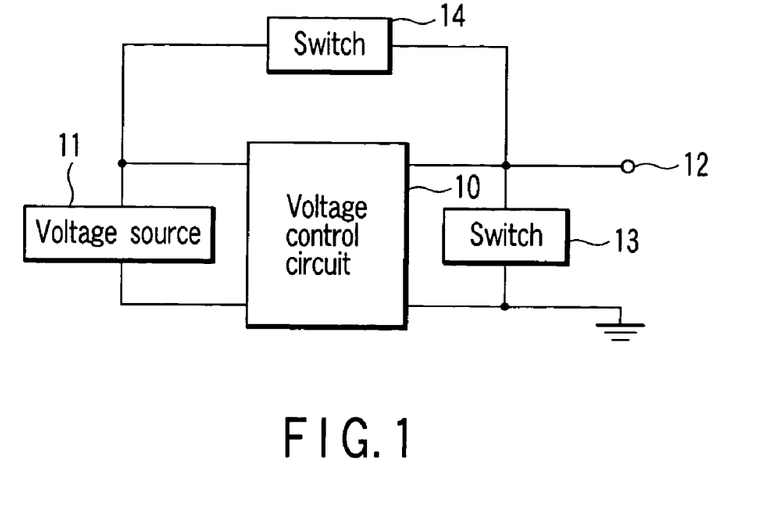
FIG. 1 is a block diagram showing a basic configuration of a power supply circuit according to the present invention.

FIG. 1 is a block diagram showing a basic configuration of a power supply circuit according to the invention. A voltage control circuit 10 is supplied with a voltage from a voltage source 11, and changes voltages of n (n being a positive integer of 2 or more) different values in accordance with control signals and outputs them to an output node 12. A first switch element 13 is connected between the output node 12 and a ground potential node (a reference voltage node). The first switch element 13 is conductive when the voltage control circuit 10 changes a voltage of the output node 12 from a first voltage to a second voltage that is lower than the first voltage, by a control circuit to be described later. After the first switch element 13 is conductive, when the output voltage of the voltage control circuit 10 reaches a desired value, the first switch element 13 is non-conductive.

Further, a second switch element 14 is connected between an output node of the voltage source 11 and the output node 12. The second switch element 14 is conductive when the voltage control circuit 10 changes the voltage of the output node 12 from a second voltage to a first voltage that is higher than the second voltage, by a control circuit to be described later. After the second switch element 14 is conductive, when the output voltage of the voltage control circuit 10 reaches a desired value, the second switch element 14 is non-conductive.

In the power supply circuit of the above configuration, the first switch element 13 becomes conductive when the output voltage of the voltage control circuit 10 changes from a high voltage (first voltage) to a low voltage (second voltage), and the second switch element 14 becomes conductive when the output voltage of the voltage control circuit 10 changes from a low voltage to a high voltage. Therefore, in the case where a load capacitor exists parasitically in the output node 12, and an inductor and a capacitor are included in the voltage control circuit 10, energies accumulated in these inductor and capacitor are charged and discharged. Thus, it is possible to change the output voltage from a high voltage to a low voltage, or vice versa, at a high speed.

Various embodiments according to the present invention will be explained hereinafter.

FIRST EMBODIMENT

Figure 2:
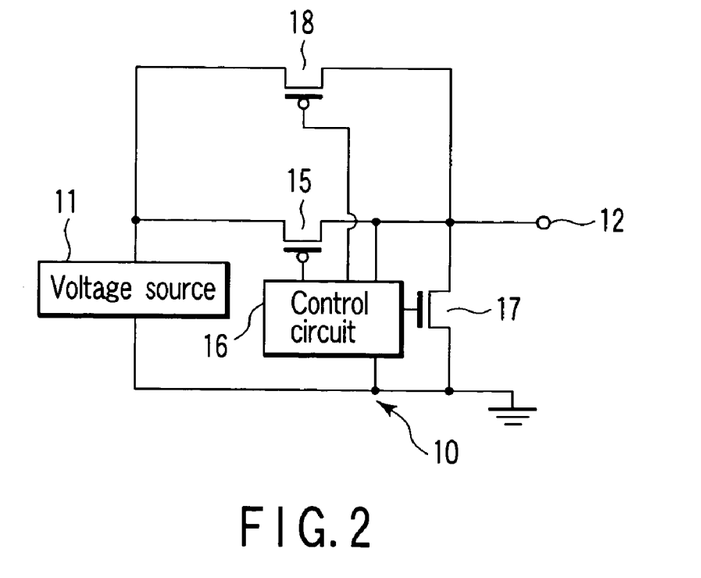
FIG. 2 is a block diagram showing a schematic configuration of a power supply circuit according to a first embodiment of the invention.

FIG. 2 is a block diagram showing a schematic configuration of a case in which the present invention is applied to a power supply circuit of a dropper type converter. In the power supply circuit of the embodiment, the voltage control circuit 10 includes a PMOS transistor 15 for voltage drop, and a control circuit 16 that controls a gate electrode of the PMOS transistor 15. In addition, the first switch element 13 comprises an NMOS transistor 17 for discharging, and a gate electrode of the NMOS transistor 17 is also controlled by the control circuit 16. Further, the second switch element 14 comprises a PMOS transistor 18 for charging, and a gate electrode of the PMOS transistor 18 is also controlled by the control circuit 16.

Figure 3:
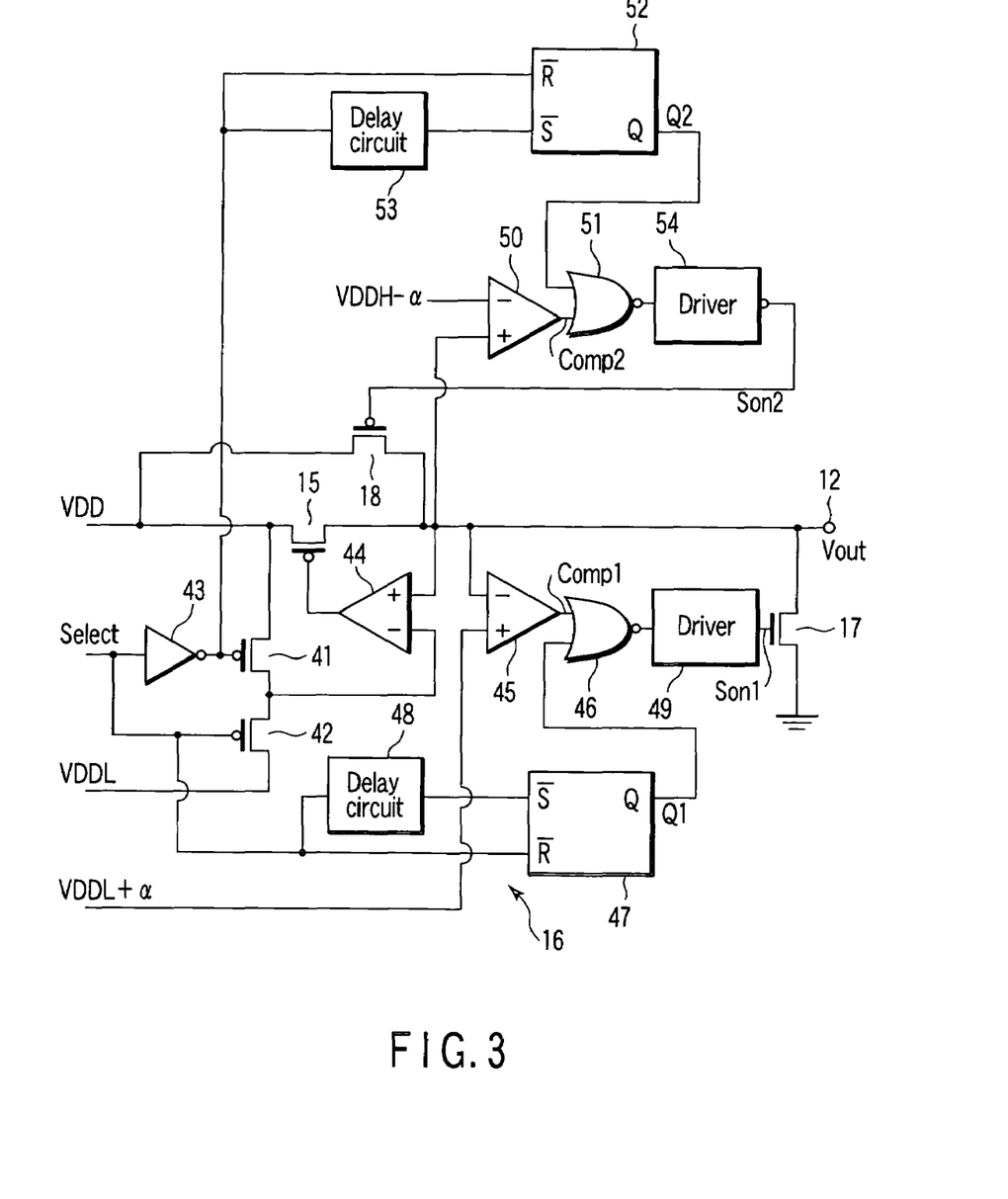
FIG. 3 is a circuit diagram showing an example of a specific configuration of a control circuit in FIG. 2.

FIG. 3 shows an example of a specific circuit configuration of the control circuit 16 in FIG. 2 together with the PMOS transistor 15, the NMOS transistor 17 and the PMOS transistor 18.

One end of current path between a source and a drain of the PMOS transistor 15 is connected to a node of a voltage VDD supplied from the voltage source 11. The other end of the current path between the source and drain of the PMOS transistor 15 is connected to the output node 12. Two current paths between a source and a drain of two PMOS transistors 41 and 42 are connected in series between the node of the voltage VDD, and a node to which a reference voltage VDDL. The reference voltage VDDL has a lower value than the voltage VDD. These two PMOS transistors 41 and 42 configure a selection circuit.

A control signal Select is used for switching and outputting voltages of two different values from the output node 12 of the voltage control circuit 10. The control signal Select is supplied to a gate electrode of the PMOS transistor 42, and supplied to a gate electrode of the PMOS transistor 41 via an inverter circuit 43.

A first voltage comparison circuit 44 compares the voltage of the output node 12, and the voltage of the series connection node between the current paths of the PMOS transistors 41 and 42. An output signal of the first voltage comparison circuit 44 is supplied to the gate electrode of the PMOS transistor 15.

A second voltage comparison circuit 45 compares the voltage of the output node 12, and a reference voltage VDDL+α. The reference voltage VDDL+α has a slightly higher value than the reference voltage VDDL. An output signal Comp1 of the second voltage comparison circuit 45 is supplied to one of input terminals of an NOR gate circuit 46.

A flip flop circuit 47 is a set/reset type flip flop circuit. To a reset terminal (/R) of the flip flop circuit 47, the control signal Select is supplied. Further, to a set terminal (/S) thereof, the control signal Select is supplied via a delay circuit 48. An output signal Q1 of the flip flop circuit 47 is supplied to the other input terminal of the NOR gate circuit 46. An output signal of the NOR gate circuit 46 is supplied as a driving signal Son1 to the gate electrode of the NMOS transistor 17 for discharging via a driver 49.

A third voltage comparison circuit 50 compares the voltage of the output node 12, and a reference voltage VDDH−α. The reference voltage VDDH−α has a value higher than the reference voltage VDDL, and slightly lower than the voltage VDD. An output signal Comp2 of the third voltage comparison circuit 50 is supplied to one of input terminals of an NOR gate circuit 51.

A flip flop circuit 52 is a set/reset type flip flop circuit. To a reset terminal (/R) of the flip flop circuit 52, an inversion signal of the control signal Select is supplied. Further, to a set terminal (/S), an inversion signal of the control signal Select is supplied via a delay circuit 53. An output signal Q2 of the flip flop circuit 52 is supplied to the other input terminal of the NOR gate circuit 51. An output signal of the NOR gate circuit 51 is supplied as a driving signal Son2 to a gate electrode of the PMOS transistor 18 for charging via an inversion type driver 54.

Figure 4:
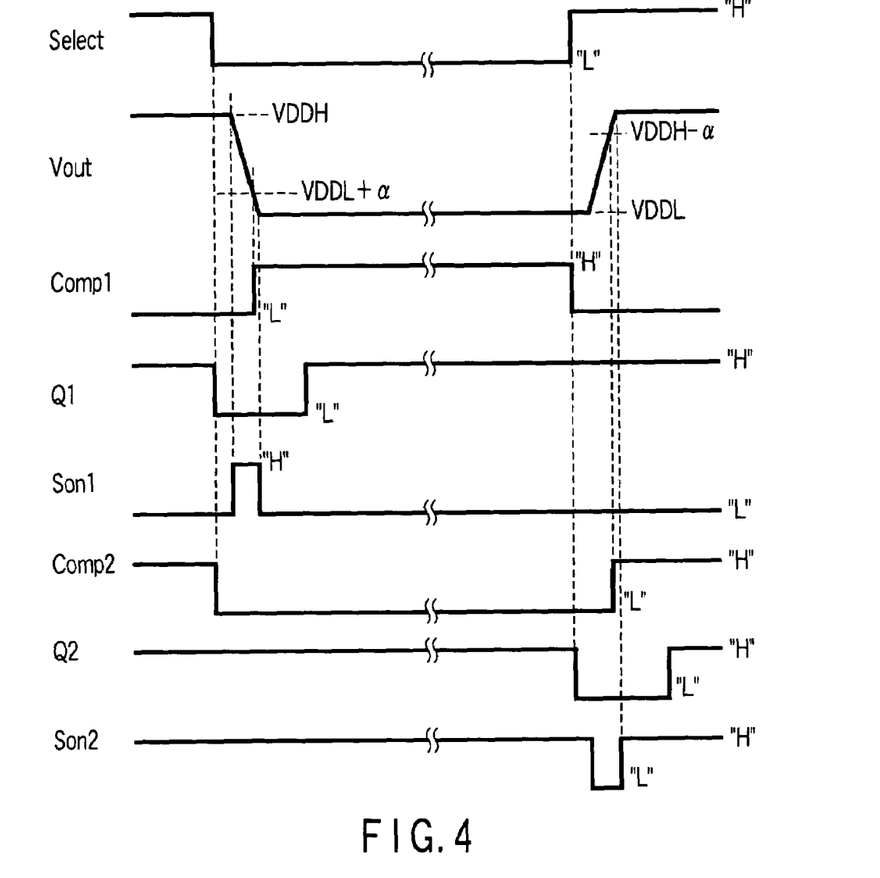
FIG. 4 is a waveform diagram showing an example of operation of the power supply circuit according to the first embodiment.

Next, an example of operation of the power supply circuit in FIG. 3 will be explained by reference to a waveform diagram shown in FIG. 4. When the control signal Select is at an "H" level, the PMOS transistor 41 is conductive, and the voltage VDD supplied from the voltage source 11 is supplied to an inversion input terminal of the voltage comparison circuit 44. At this time, the gate of the PMOS transistor 15 is controlled on the basis of the output signal of the first voltage comparison circuit 44, so that at the output node 12 of the voltage control circuit 10, a voltage having the value of VDDH nearly close to VDD is obtained as an output voltage Vout. At this time, the flip flop circuit 47 is in set state, and the output signal Q1 thereof is at the "H" level. In this case, the output signal of the NOR gate circuit 46 becomes at an "L" level, and the output signal Son1 of the driver circuit 49 also becomes at the "L" level, and the NMOS transistor 17 is in non-conductive state.

Next, in order to change the value of the output voltage Vout of the output node 12 from VDDH to VDDL, the control signal Select is lowered to the "L" level. Then, the PMOS transistor 42 is conductive, and the reference voltage VDDL having the same value as the objective voltage is supplied to the inversion input terminal of the first voltage comparison circuit 44. At this time, the gate of the PMOS transistor 15 is controlled on the basis of the output signal of the first voltage comparison circuit 44, so that the voltage control circuit 10 starts outputting a voltage having the same value as the reference voltage VDDL from the voltage VDDH.

On the other hand, when the control signal Select becomes at the "L" level, the flip flop circuit 47 is reset, and the output signal Q1 thereof inverts to the "L" level. At this time, the output voltage Vout is still a value near the VDDH, and is higher than the reference voltage VDDL+α, and therefore, the output signal Comp1 of the second voltage comparison circuit 45 is at the "L" level. Accordingly, after the output signal Q1 of the flip flop circuit 47 inverts to the "L" level, the output signal of the NOR gate circuit 46 inverts to the "H" level. When a delay time of the driver circuit 49 has lapsed after the output signal of the NOR gate circuit 46 inverts to the "H" level, the output signal Son1 of the driver 49 inverts to the "H" level as well, so that the NMOS transistor 17 becomes conductive. Consequently, the output node 12 is discharged to the ground potential node, and the output voltage Vout starts changing from the VDDH to the VDDL at a high speed.

When the value of the output voltage Vout becomes lower than the reference voltage VDDL+α, the output signal Comp1 of the second voltage comparison circuit 45 inverts to the "H" level, and the output signal of the NOR gate circuit 46 invert to the "L" level. When the delay time of the driver circuit 49 has lapsed after the output signal of the NOR gate circuit 46 inverts to the "L" level, the output signal Son1 of the driver 49 invert to the "L" level. Thus, the conductive state of the NMOS transistor 17 is released and becomes in the non-conductive state, and the discharge from the output node 12 stops. At this time, the output voltage Vout goes low to a value sufficiently close to the objective voltage VDDL, and the output voltage Vout reaches the VDDL finally.

When a specified period has lapsed after the output signal Comp1 of the second voltage comparison circuit 45 inverts to the "H" level, and the output signal of the delay circuit 48 inverts from the "H" level to the "L" level, the flip flop circuit 47 is set, and the output signal Q1 thereof inverts from the "L" level to the "H" level. At this time, because the output signal Comp1 of the second voltage comparison circuit 45 is already at the "H" level, the output signal of the NOR gate circuit 46 and the output signal Son1 of the driver 49 remain at the "L" level, and the NMOS transistor 17 maintains non-conductive state.

Next, in order to change the value of the output voltage Vout of the output node 12 to VDDH, the control signal Select is raised to the "H" level. Then, the PMOS transistor 41 becomes conductive, and the same voltage as the VDD is supplied to the inversion input terminal of the first voltage comparison circuit 44. At this time, the gate of the PMOS transistor 15 is controlled on the basis of the output signal of the first voltage comparison circuit 44, so that the voltage control circuit 10 starts outputting a voltage having the same value as the voltage VDD from the reference voltage VDDL.

On the other hand, when the control signal Select becomes at the "H" level, the flip flop circuit 52 is reset, and the output signal Q2 thereof inverts to the "L" level. At this time, the output voltage Vout is still a value near the VDDL, and is lower than the reference voltage VDDH−α, and therefore, the output signal Comp2 of the third voltage comparison circuit 50 is at the "L" level. Accordingly, after the output signal Q2 of the flip flop circuit 52 inverts to the "L" level, the output signal of the NOR gate circuit 51 inverts to the "H" level. When a delay time of the driver circuit 54 has lapsed after the output signal of the NOR gate circuit 51 inverts to the "H" level, the output signal Son2 of the driver 54 inverts to the "L" level, so that the PMOS transistor 18 becomes conductive. Consequently, the output node 12 is charged to the VDD, and the output voltage Vout starts changing from the VDDL to the VDDH at a high speed.

When the value of the output voltage Vout becomes higher than the reference voltage VDDH−α, the output signal Comp2 of the third voltage comparison circuit 50 inverts to the "H" level, and the output signal of the NOR gate circuit 51 inverts to the "L" level. When the delay time of the driver circuit 54 has lapsed after the output signal of the NOR gate circuit 51 inverts to the "L" level, the output signal Son2 of the driver 54 inverts to the "H" level sequentially. Thus, the conductive state of the PMOS transistor 18 is released and becomes non-conductive state, and the charging operation to the output node 12 via the PMOS transistor 18 stops. At this time, the output voltage Vout goes high to a value sufficiently close to the objective voltage VDD, and thereafter, the output voltage Vout is continuously charged via the PMOS transistor 15, and thereby reaches the VDD finally.

When a specified period has lapsed after the output signal Comp2 of the third voltage comparison circuit 50 inverts to the "H" level, and the output signal of the delay circuit 53 inverts from the "H" level to the "L" level, the flip flop circuit 52 is set, and the output signal Q2 thereof inverts from the "L" level to the "H" level. At this time, because the output signal Comp2 of the third voltage comparison circuit 50 is already at the "H" level, the output signal of the NOR gate circuit 51 and the output signal Son2 of the driver 54 remain at the "L" level and the "H" level, respectively, and the PMOS transistor 18 maintains non-conductive state.

As explained above, in the power supply circuit of the present embodiment, the NMOS transistor 17 becomes conductive when the output voltage of the voltage control circuit 10 changes from the high voltage (VDDH) to the low voltage (VDDL). Therefore, energy accumulated in load capacitor parasitically existing in the output node 12 is discharged to the ground potential node, and the output voltage rapidly changes from the high voltage to the low voltage. Further, when the output voltage of the voltage control circuit 10 changes from the low voltage (VDDL) to the high voltage (VDDH), the PMOS transistor 18 becomes conductive. Therefore, energy is charged to load capacitor parasitically existing in the output node 12, and the output voltage changes from the low voltage to the high voltage at a high speed.

As a result that the Applicants have executed simulation on the power supply circuit of the embodiment shown in FIG. 3 by use of a CMOS process having a design rule of 0.18 μm, it has been confirmed that the output voltage goes up and down by 40% for one nano second.

SECOND EMBODIMENT

Figure 5:
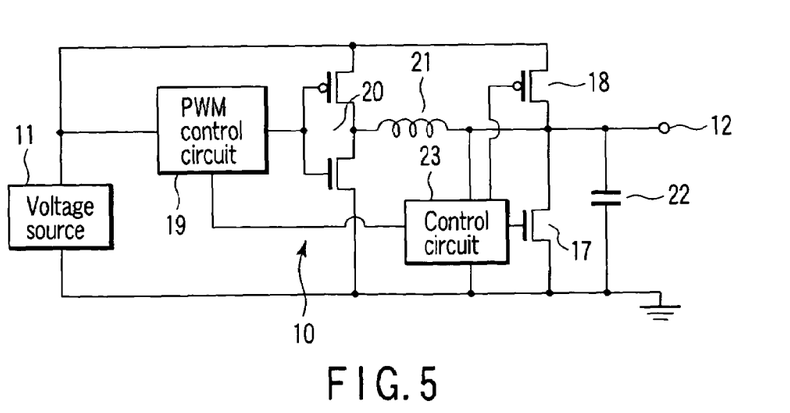
FIG. 5 is a block diagram showing a schematic configuration of a power supply circuit according to a second embodiment of the invention.

FIG. 5 is a block diagram showing a schematic configuration of a case in which the invention is applied to a power supply circuit of a buck converter. In the power supply circuit of the embodiment, the voltage control circuit 10 in FIG. 1 includes a pulse width modulation (PWM) control circuit 19; a driver 20 including an NMOS transistor and a PMOS transistor, the driver being controlled by the PWM control circuit 19; and an inductor 21 and a capacitor 22 driven by the driver 20.

In addition, the first switch element 13 in FIG. 1 comprises an NMOS transistor 17, and a gate electrode of the NMOS transistor 17 is controlled by a control circuit 23. Further, the second switch element 14 in FIG. 1 comprises a PMOS transistor 18, and a gate electrode of the PMOS transistor 18 is controlled by the control circuit 23.

Figure 6:
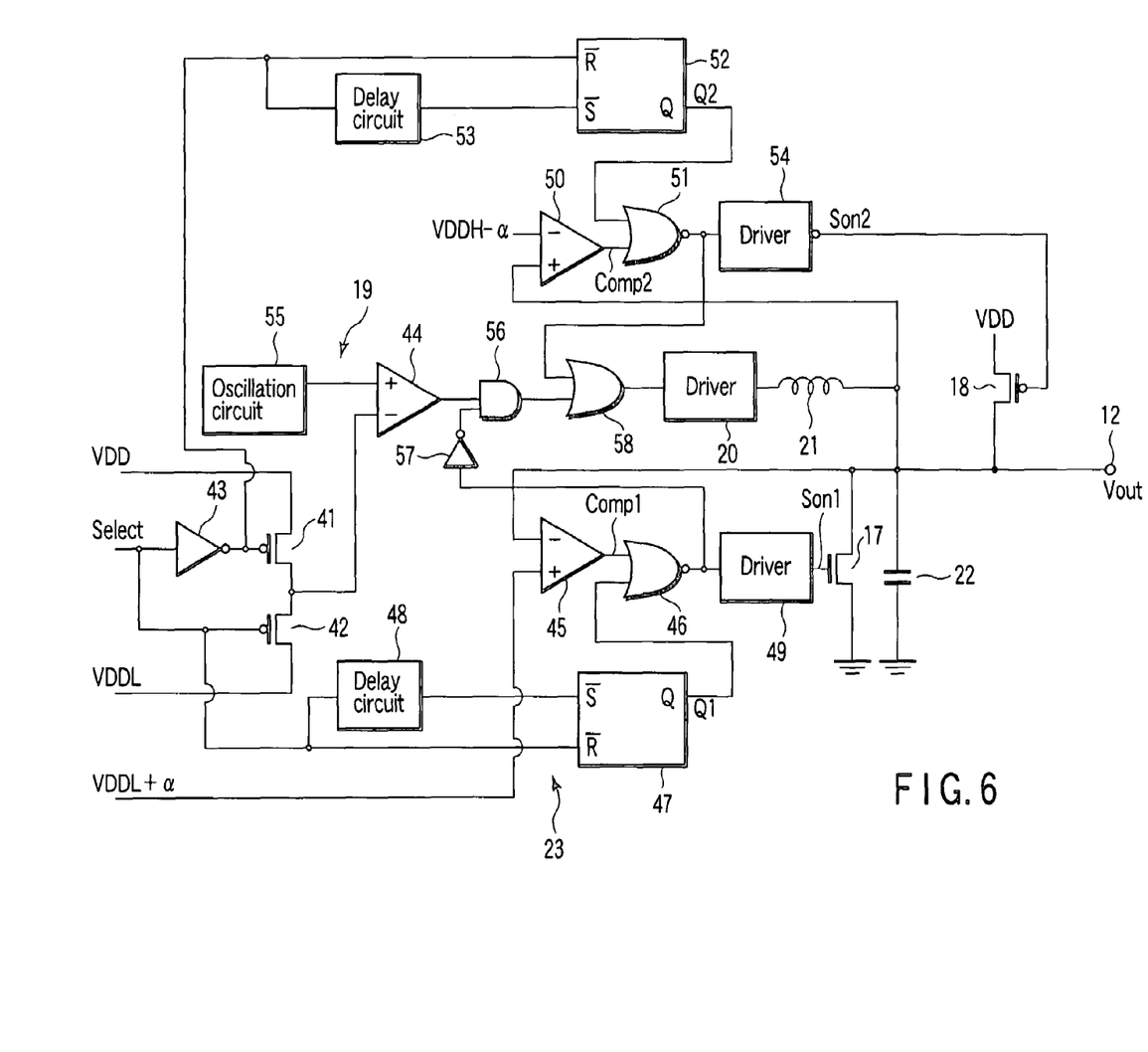
FIG. 6 is a circuit diagram showing an example of a specific configuration of a control circuit in FIG. 5.

FIG. 6 is a circuit diagram showing an example of a specific circuit configuration of the PWM control circuit 19 and the control circuit 23 in FIG. 5 together with the NMOS transistor 17, and the PMOS transistor 18.

The control circuit 23 includes delay circuits 48 and 53, flip flop circuits 47 and 52, second and third voltage comparison circuits 45 and 50, NOR gate circuits 46 and 51, drivers 49 and 54 and so forth shown in FIG. 3.

The PWM control circuit 19 includes an oscillation circuit 55, an AND gate circuit 56 and an inverter circuit 57, and an OR gate circuit 58, besides the first voltage comparison circuit 44 shown in FIG. 3. The first voltage comparison circuit 44 compares an output signal of the oscillation circuit 55 and a voltage of a series connection node between the current paths of the two PMOS transistors 41 and 42. An output signal of the first voltage comparison circuit 44 is supplied to one input terminal of the AND gate circuit 56. To the other input terminal of the AND gate circuit 56, an output signal of the NOR gate circuit 46 in the control circuit 23 is supplied via the inverter circuit 57. An output signal of the AND gate circuit 56 is supplied to one input terminal of the OR gate circuit 58. To the other input terminal of the OR gate circuit 58, an output signal of the NOR gate circuit 51 in the control circuit 23 is supplied. An output signal of the OR gate circuit 58 is supplied to one end of the inductor 21 via the driver 20. The other end of the inductor 21 is connected to the output node 12. Further, the capacitor 22 is connected between the output node 22 and a ground potential node.

Next, operation of the power supply circuit in FIG. 6 will be explained hereinafter. When the control signal Select is at the "H" level, the PMOS transistor 41 becomes conductive, and the voltage VDD supplied from the voltage source 11 is supplied to the inversion input terminal of the first voltage comparison circuit 44. At this time, the first voltage comparison circuit 44 compares an oscillation signal of the oscillation circuit 55 and the voltage VDD, and a signal having a relatively large duty is output from the first voltage comparison circuit 44. At this time, the output signal of the inverter circuit 57 is at the "H" level, and the output of the NOR gate circuit 51 is at the "L" level. Therefore, the output signal of the first voltage comparison circuit 44 is supplied to the driver 20 via the AND gate circuit 56 and the OR gate circuit 58, so that a high voltage having the value of the VDDH is obtained as the output voltage Vout at the output node 12 of the voltage control circuit 10. At this time, the flip flop circuit 47 in the control circuit 23 is in set state, and the output signal Q1 thereof is at the "H" level. In this case, the output signal of the NOR gate circuit 46 is at the "L" level, and the output signal Son1 of the driver 49 is also at the "L" level, so that the NMOS transistor 17 is in non-conductive state. In addition, the flip flop circuit 52 in the control circuit 23 is made in set state, and the output signal Q2 thereof is at the "H" level. In this case, the output signal of the NOR gate circuit 51 is at the "L" level, and the output signal Sin2 of the driver 54 is at the "H" level, so that the PMOS transistor 18 is in non-conductive state.

Next, in order to change the value of the output voltage Vout of the output node 12 from VDDH to VDDL, the control signal Select is lowered to the "L" level. Then, in the same manner as explained in FIG. 3, the flip flop circuit 47 is reset, and the output signal Q1 thereof inverts to the "L" level. At this time, the output voltage Vout is still at VDDH, and is higher than the reference voltage VDDL+α, and thus, the output signal Comp1 of the second voltage comparison circuit 45 is at the "L" level. Accordingly, after the output signal Q1 of the flip flop circuit 47 inverts to the "L" level, the output signal of the NOR gate circuit 46 inverts to the "H" level, and the output signal Son1 of the driver 49 inverts to the "H" level as well, so that the NMOS transistor 17 becomes conductive. Consequently, the output node 12 is discharged to the ground potential node, and the output voltage Vout starts changing from VDDH to VDDL.

On the other hand, when the output signal of the NOR gate circuit 46 becomes the "H" level, the output signal of the inverter circuit 57 in the PWM control circuit 19 becomes the "L" level, and the output signal of the AND gate circuit 56 also becomes the "L" level. Accordingly, the driver 20 is not driven, and the energy supply to the output node 12 by the voltage control circuit 10 stops, and the energy accumulated in the capacitor 22 is discharged via the NMOS transistor 17 to the ground potential node at a high speed. As a result, the output voltage Vout changes from VDDH to VDDL at a high speed.

When the value of the output voltage Vout becomes lower than the reference voltage VDDL+α, the output signal of the NOR gate circuit 46 and the output signal Son1 of the driver 49 invert to the "L" level as explained previously, and the conductive state of the NMOS transistor 17 is released and becomes non-conductive, so that the discharge from the output node 12 stops. Thereafter, the output signal of the inverter circuit 57 becomes the "H" level, the output signal of the first comparison circuit 44 whose duty is relatively small is supplied to the driver 20 via the AND gate circuit 56 and the OR gate circuit 58, and a low voltage having the value of VDDL is obtained as the output voltage Vout at the output node 12 of the voltage control circuit 10.

Next, in order to change the value of the output voltage Vout of the output node 12 from VDDL to VDDH, the control signal Select is raised to the "H" level. Then, in the same manner as explained in FIG. 3, the flip flop circuit 52 is reset, and the output signal Q2 thereof inverts to the "L" level. At this time, the output voltage Vout is still at VDDL, and is lower than the reference voltage VDDH−α, and thus, the output signal Comp2 of the third voltage comparison circuit 50 is at the "L" level. Accordingly, after the output signal Q2 of the flip flop circuit 52 inverts to the "L" level, the output signal of the NOR gate circuit 51 inverts to the "H" level, and the output signal Son2 of the driver 54 inverts to the "L" level, so that the PMOS transistor 18 becomes conductive. Thereby, the charge of the output node 12 is started, and the output voltage Vout starts changing from VDDL to VDDH.

When the output signal of the NOR gate circuit 51 becomes the "H" level, on the other hand, the output signal of the OR gate circuit 58 in the PWM control circuit 19 becomes the "H" level. Therefore, the driver 20 is driven continuously, the capacitor 22 is charged, and as a result, the output voltage Vout changes from VDDL to VDDH at a high speed.

When the value of the output voltage Vout becomes higher than the reference voltage VDDH−α, the output signal of the NOR gate circuit 51 and the output signal Son2 of the driver 54 invert to the "H" level as explained previously, the conductive state of the PMOS transistor 18 is released and becomes non-conductive, and the charge to the output node 12 stops. Thereafter, the output signal of the NOR gate circuit 51 becomes the "L" level, the output signal of the first comparison circuit 44 whose duty is relatively large is supplied to the driver 20 via the AND gate circuit 56 and the OR gate circuit 58, and a high voltage having the value of VDDH is obtained as the output voltage Vout at the output node 12 of the voltage control circuit 10.

As explained above, in the power supply circuit of the present embodiment, the NMOS transistor 17 becomes conductive when the output voltage of the voltage control circuit 10 changes from the high voltage (VDDH) to the low voltage (VDDL). Therefore, energy accumulated in the capacitor 22 connected to the output node 12 is discharged to the ground potential node, and the output voltage rapidly changes from the high voltage to the low voltage. Further, when the output voltage of the voltage control circuit 10 changes from the low voltage (VDDL) to the high voltage (VDDH), the PMOS transistor 18 becomes conductive. Therefore, the capacitor 22 connected to the output node 12 is charged, and the output voltage changes from the low voltage to the high voltage at a high speed.

As a result that the Applicants have executed simulation on the power supply circuit of the embodiment shown in FIG. 6 by use of a CMOS process having a design rule of 0.18 μm, it has been confirmed that the output voltage goes up and down by 50% for one nano second.

THIRD EMBODIMENT

Figure 7:
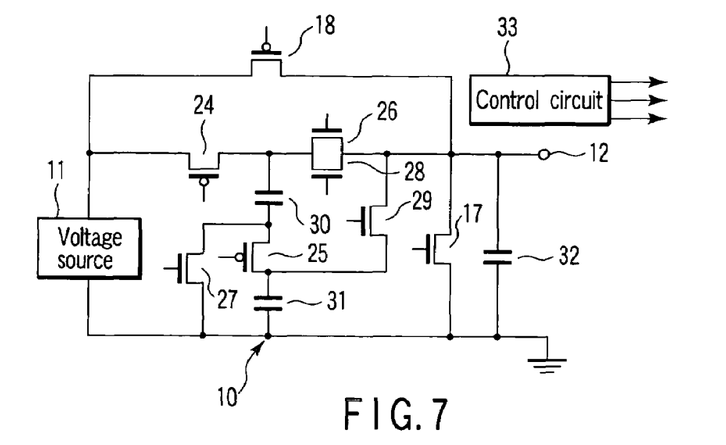
FIG. 7 is a block diagram showing a schematic configuration of a power supply circuit according to a third embodiment of the invention.

FIG. 7 is a block diagram showing a schematic configuration of a case in which the invention is applied to a power supply circuit of a switched capacitor. In the power supply circuit of the present embodiment, the voltage control circuit 10 in FIG. 1 is a switched capacitor circuit including PMOS transistors 24 and 25, NMOS transistors 26 to 29, capacitors 30 to 32, and a control circuit 33 that carries out gate control of the PMOS transistors and NMOS transistors. Further, the first switch element 13 in FIG. 1 comprises an NMOS transistor 17 for discharging, and a gate electrode of the NMOS transistor 17 is controlled by a control signal output from the control circuit 33. The second switch element 14 in FIG. 1 comprises a PMOS transistor 18 for charging, and a gate electrode of the PMOS transistor 18 is also controlled by the control signal output from the control circuit 33.

Figure 8:
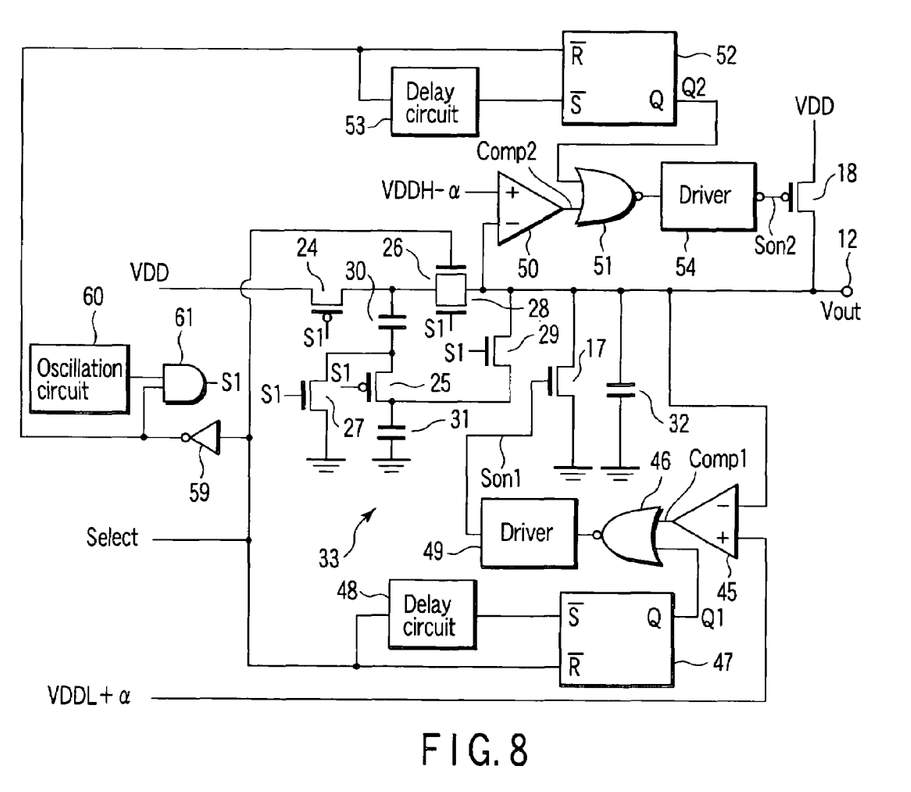
FIG. 8 is a circuit diagram showing an example of a specific configuration of a control circuit in FIG. 7.

FIG. 8 shows an example of a specific circuit configuration of the control circuit 33 in FIG. 7 together with the NMOS transistor 17 and the PMOS transistor 18.

The control circuit 33 includes, in addition to the delay circuits 48 and 53, the flip flop circuits 47 and 52, the second and third voltage comparison circuits 45 and 50, the NOR gate circuits 46 and 51, and the drivers 49 and 54 shown in FIG. 3, an inverter circuit 59, an oscillation circuit 60 and an AND gate circuit 61.

The control signal Select is inverted by the inverter circuit 59 and supplied to one input terminal of the AND gate circuit 61. To the other input terminal of the AND gate circuit 61, an oscillation signal of the oscillation circuit 60 is supplied. An output signal of the AND gate circuit 61 is supplied as a control signal S1 to respective gate electrodes of the PMOS transistors 24 and 25 and respective gate electrodes of the NMOS transistors 27 to 29 in the voltage control circuit 10. To a gate electrode of the NMOS transistor 26, the control signal Select is supplied.

Next, operation of the power supply circuit in FIG. 8 will be explained hereinafter. When the control signal Select is at the "H" level, a signal at the "H" level is supplied to the gate electrode of the NMOS transistor 26 in the voltage control circuit 10, and a signal at the "L" level is supplied to the other respective gate electrodes of the PMOS transistors 24 and 25 and NMOS transistors 27 to 29 in the voltage control circuit 10. As a result, the voltage VDD of the voltage source 11 is output to the output node 12 via the PMOS transistor 24 and NMOS transistor 26, and a high voltage VDDH that is almost same as the voltage VDD is obtained as the output voltage Vout at the output node 12. At this time, the flip flop circuit 47 in the control circuit 33 is in set state, and the output signal Q1 thereof is at the "H" level. In this case, the output signal of the NOR gate circuit 46 is at the "L" level, and the output signal Son1 of the driver 49 is at the "L" level, so that the NMOS transistor 17 is in non-conductive state. Further, the flip flop circuit 52 in the control circuit 33 is in set state, and the output signal Q2 thereof is at the "H" level. In this case, the output signal of the NOR gate circuit 51 becomes the "L" level, and the output signal Son2 of the driver 54 becomes the "H" level, so that the PMOS transistor 18 is in non-conductive state.

Next, in order to change the value of the output voltage Vout of the output node 12 from VDDH to VDDL, the control signal Select is lowered to the "L" level. Then, in the same manner as explained in FIG. 3, the flip flop circuit 47 is reset, and the output signal Q1 thereof inverts to the "L" level. At this time, the output voltage Vout is still at VDDH, and is higher than the reference voltage VDDL+α, and therefore, the output signal Comp1 of the second voltage comparison circuit 45 is at the "L" level. Accordingly, after the output signal Q1 of the flip flop circuit 47 inverts to the "L" level, the output signal of the NOR gate circuit 46 inverts to the "H" level, the output signal Son1 of the driver 49 inverts to the "H" level as well, and the NMOS transistor 17 becomes conductive. Consequently, energy accumulated in the capacitor 32 is discharged to the ground potential node at a high speed.

When the control signal Select becomes the "L" level, on the other hand, the NMOS transistor 26 becomes non conductive. In addition, the oscillation signal of the oscillation circuit 60 is supplied as a control signal S1 to the voltage control circuit 10 via the AND gate circuit 61, and the voltage control circuit 10 starts its operation. In this case, the voltage control circuit 10 outputs a voltage VDDL of a low value approximately VDD/2 as Vout.

When the value of the output voltage Vout becomes lower than the reference voltage VDDL+α, the output signal of the NOR gate circuit 46 and the output signal Son1 of the driver 49 invert to the "L" level as explained previously, the conductive state of the NMOS transistor 17 is released and becomes non-conductive, and the discharge from the output node 12 stops.

Next, in order to change the value of the output voltage Vout of the output node 12 from VDDL to VDDH, the control signal Select is raised to the "H" level. Then, in the same manner as explained in FIG. 3, the flip flop circuit 52 is reset, and the output signal Q2 thereof inverts to the "L" level. At this time, since the output voltage Vout is still at VDDL, and is lower than the reference voltage VDDH-α, the output signal Comp2 of the third voltage comparison circuit 50 is at the "L" level. Therefore, after the output signal Q2 of the flip flop circuit 52 inverts to the "L" level, the output signal of the NOR gate circuit 51 inverts to the "H" level, and the output signal Son2 of the driver 54 inverts to the "L" level, so that the PMOS transistor 18 becomes conductive. Thereby, the capacitor 32 is charged rapidly.

On the other hand, when the control signal Select becomes the "H" level, the NMOS transistor 26 becomes conductive, and VDDH is output as Vout. In this case, both the NMOS transistor 26 and the PMOS transistor 18 become conductive, and contribute to charging the output node 12 to VDD.

As explained above, in the power supply circuit of the present embodiment, the NMOS transistor 17 becomes conductive when the output voltage of the voltage control circuit 10 changes from the high voltage (VDDH) to the low voltage (VDDL). Therefore, energy accumulated in the capacitor 32 connected to the output node 12 is discharged to the ground potential node, and the output voltage rapidly changes from the high voltage to the low voltage. In addition, when the output voltage of the voltage control circuit 10 changes from the low voltage (VDDL) to the high voltage (VDDH), the PMOS transistor 18 becomes conductive. Therefore, the capacitor 32 connected to the output node 12 is charged, and the output voltage changes from the low voltage to the high voltage at a high speed.

As a result that the Applicants have executed simulation on the power supply circuit of the embodiment shown in FIG. 8 by use of a CMOS process having a design rule of 0.18 µm, it has been confirmed that the output voltage goes up and down by 50% for one nano second.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents. For example, in the above embodiments, the case where the voltage control circuit 10 changes voltages of two different values according to control signals, and outputs them from the output node 12 has been explained. However, the present invention may be applied to a case in which voltages of n (n being a positive integer of 2 or more) different values are changed and output from the output node 12. Further, the embodiments have been described the case in which the circuits of the dropper type converter, buck converter, and switched capacity converter are employed as the voltage control circuit. However, the present invention may be applied to other types of voltage control circuit than the above, for example, a boost converter, a voltage rising type switched capacitor converter and the like.

What is claimed is:

1. A power supply circuit comprising:
    a voltage source whose one end is connected to a reference voltage node, the voltage source having a first output node;
    a voltage control circuit which receives a voltage of the first output node, the voltage control circuit having a second output node, and changing voltages of n (n being a positive integer of 2 or more) different values according to control signals to output them to the second output node;
    a first switch element connected between the second output node and the reference voltage node;
    a second switch element connected between the first output node and the second output node; and
    a switch control circuit which controls the first switch element so as to be conductive when the voltage control circuit changes the voltage of the second output node from a first voltage to a second voltage that is lower than the first voltage, and which controls the second switch element so as to be conductive when the voltage control circuit changes the voltage of the second output node from the second voltage to the first voltage.

2. A power supply circuit according to claim 1, wherein the switch control circuit controls the first switch element so as to be conductive until the voltage of the second output node reaches a third voltage that is lower than the first voltage and higher than the second voltage after making the first switch element conductive, and
    the switch control circuit controls the second switch element so as to be conductive until the voltage of the second output node reaches a fourth voltage that is higher than the second voltage and lower than the first voltage after making the second switch element conductive.

3. A power supply circuit according to claim 1, wherein the switch control circuit includes:
    first and second flip flop circuits which are reset, respectively, based on to the control signals;
    first and second voltage comparison circuits which compare the voltage of the second output node and the third and fourth voltages, respectively;
    a first control circuit connected to the first switch element, the first control circuit receiving output signals of the first flip flop circuit and the first voltage comparison circuit, and controlling the first switch element so as to be conductive when the first flip flop circuit is in reset state and controlling the first switch element so as to be non-conductive after the first voltage comparison circuit detects that the voltage of the second output node has become lower than the third voltage; and
    a second control circuit connected to the second switch element, the second control circuit receiving output signals of the second flip flop circuit and the second voltage comparison circuit, and controlling the second switch element so as to be conductive when the second flip flop circuit is in reset state and controlling the second switch element so as to be non-conductive after the second voltage comparison circuit detects that the voltage of the second output node has become higher than the fourth voltage.

4. A power supply circuit according to claim 1, wherein the voltage control circuit includes a transistor for voltage drop, whose current path is inserted into between the first output node and the second output node.

5. A power supply circuit according to claim 1, wherein the voltage control circuit includes:
    a selection circuit which receives the voltages of the first output node and the second voltage, and which selects and output one of the voltages according to the control signals;
    a third voltage comparison circuit which compares the voltage of the second output node and the voltage selected by the selection circuit; and
    a PMOS transistor having a gate electrode and a current path, the current path being inserted between the first output node and the second output node, and the gate electrode receiving the output of the third voltage comparison circuit.

6. A power supply circuit according to claim 1, wherein the voltage control circuit includes:
    an inductor whose one end is supplied with one of a first and a second signals which are different duty, and whose other end is connected to the second node; and
    a capacitor connected between the second node and the reference voltage node.

7. A power supply circuit according to claim 1, wherein the voltage control circuit includes:
    a selection circuit which receives the voltages of the first output node and the second voltage, and which selects and output one of the voltages according to the control signals;
    an oscillation circuit;
    a third voltage comparison circuit which compares an output voltage of the oscillation circuit and the voltage selected by the selection circuit;
    an inductor whose one end receives an output of the third voltage comparison circuit, and whose other end is connected to the second node; and
    a capacitor connected between the second node and the reference voltage node.

8. A power supply circuit according to claim 1, wherein the voltage control circuit is a switched capacitor circuit connected between the first node and the second node.

9. A power supply circuit according to claim 1, wherein the first switch element is an NMOS transistor.

10. A power supply circuit according to claim 1, wherein the second switch element is a PMOS transistor.

* * * * *